US008313374B2

(12) United States Patent
Loose

(10) Patent No.: US 8,313,374 B2
(45) Date of Patent: Nov. 20, 2012

(54) GAMING MACHINE HAVING IMPROVED AUDIO CONTROL ARCHITECTURE

(75) Inventor: Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 2062 days.

(21) Appl. No.: 10/366,948

(22) Filed: Feb. 14, 2003

(65) Prior Publication Data

US 2004/0161115 A1 Aug. 19, 2004

(51) Int. Cl.
*A63F 13/00* (2006.01)
*G06F 17/00* (2006.01)

(52) U.S. Cl. ................. 463/31; 463/20; 463/47; 700/94

(58) Field of Classification Search .................... 463/20, 463/31, 47; 700/94
See application file for complete search history.

(56) References Cited

U.S. PATENT DOCUMENTS

| | | | | |
|---|---|---|---|---|
| 3,533,629 | A | 10/1970 | Raven | 273/138 |
| 4,522,399 | A | 6/1985 | Nishikawa | 273/143 R |
| 5,133,017 | A | 7/1992 | Cain et al. | 381/71 |
| 5,259,613 | A | 11/1993 | Marnell, II | 273/138 |
| 5,318,298 | A | 6/1994 | Kelly et al. | 273/122 R |
| 5,370,399 | A | 12/1994 | Liverance | 273/434 |
| 5,411,258 | A * | 5/1995 | Wilson et al. | 463/6 |
| 5,444,786 | A | 8/1995 | Raviv | 381/71 |
| 5,469,510 | A | 11/1995 | Blind et al. | 381/55 |
| 5,524,888 | A | 6/1996 | Heidel | 463/22 |
| 5,533,727 | A | 7/1996 | DeMar | 463/23 |
| 5,542,669 | A | 8/1996 | Charron et al. | 463/13 |
| 5,655,961 | A | 8/1997 | Acres et al. | 463/27 |
| 5,695,188 | A | 12/1997 | Ishibashi | 273/143 R |
| 5,743,798 | A | 4/1998 | Adams et al. | 463/17 |
| 5,762,552 | A | 6/1998 | Vuong et al. | 463/25 |
| 5,775,993 | A | 7/1998 | Fentz et al. | 463/17 |
| 5,807,177 | A * | 9/1998 | Takemoto et al. | 463/47 |

(Continued)

FOREIGN PATENT DOCUMENTS

AU 199943487 A1 3/2000

(Continued)

OTHER PUBLICATIONS

McGuire, Thomas, "Creative Sound Blaster Extigy review", Jul. 9, 2002, accessed Feb. 2, 2007, 8 pages, <http://www.techspot.com/reviews/hardware/extigy/>.*

(Continued)

*Primary Examiner* — David L Lewis
*Assistant Examiner* — William H McCulloch, Jr.
(74) *Attorney, Agent, or Firm* — Nixon Peabody LLP

(57) ABSTRACT

The present invention includes a gaming machine with a first control module that includes a main processor for randomly selecting one of a plurality of outcomes of said gaming machine in response to a wager amount and for sending audio information that controls audio output from the gaming machine. An audio control module is separate and distinct from the first control module, and includes an audio processor that receives the audio information from the main processor. The audio control module is coupled to an audio speaker system for broadcasting the audio output corresponding to the audio information. Also, the first control module may include a memory device that stores operating instructions for the gaming machine, while the audio control module may include an audio memory device for storing audio data sets that the audio processor processes to produce the audio output.

28 Claims, 3 Drawing Sheets

U.S. PATENT DOCUMENTS

| | | | | |
|---|---|---|---|---|
| 5,816,918 | A | 10/1998 | Kelly et al. | 463/16 |
| 5,828,768 | A * | 10/1998 | Eatwell et al. | 381/333 |
| 5,833,538 | A | 11/1998 | Weiss | 463/21 |
| 5,851,148 | A | 12/1998 | Brune et al. | 463/25 |
| 5,941,773 | A | 8/1999 | Harlick | 463/26 |
| 5,971,850 | A | 10/1999 | Liverance | 463/23 |
| 6,068,552 | A | 5/2000 | Walker et al. | 463/21 |
| 6,088,461 | A * | 7/2000 | Lin et al. | 381/104 |
| 6,089,663 | A | 7/2000 | Hill | 297/258.1 |
| 6,110,041 | A | 8/2000 | Walker et al. | 463/20 |
| 6,146,273 | A * | 11/2000 | Olsen | 463/27 |
| 6,162,121 | A | 12/2000 | Morro et al. | 463/16 |
| 6,217,448 | B1 | 4/2001 | Olsen | 463/25 |
| 6,254,483 | B1 | 7/2001 | Acres | 463/26 |
| 6,302,790 | B1 * | 10/2001 | Brossard | 463/20 |
| 6,308,953 | B1 | 10/2001 | Nagano | 273/143 R |
| 6,315,666 | B1 * | 11/2001 | Mastera et al. | 463/31 |
| 6,368,216 | B1 * | 4/2002 | Hedrick et al. | 463/20 |
| 6,416,411 | B1 | 7/2002 | Tsukahara | 463/35 |
| 6,422,941 | B1 | 7/2002 | Thorner et al. | 463/30 |
| 6,471,589 | B1 | 10/2002 | Nagano | 463/21 |
| 6,530,842 | B1 | 3/2003 | Wells et al. | 463/46 |
| 6,537,152 | B2 * | 3/2003 | Seelig et al. | 463/30 |
| 6,561,908 | B1 * | 5/2003 | Hoke | 463/35 |
| 6,638,169 | B2 | 10/2003 | Wilder et al. | 463/35 |
| 6,676,514 | B1 | 1/2004 | Kusuda et al. | 463/24 |
| 6,780,103 | B2 * | 8/2004 | Bansemer et al. | 463/7 |
| 6,840,860 | B1 * | 1/2005 | Okuniewicz | 463/35 |
| 6,848,996 | B2 * | 2/2005 | Hecht et al. | 463/35 |
| 6,866,581 | B2 * | 3/2005 | Martinek et al. | 463/16 |
| 6,935,946 | B2 * | 8/2005 | Yoseloff et al. | 463/16 |
| 6,942,574 | B1 * | 9/2005 | LeMay et al. | 463/41 |
| 2002/0037763 | A1 | 3/2002 | Idaka | 463/16 |
| 2002/0039919 | A1 | 4/2002 | Joshi et al. | 463/20 |
| 2002/0052230 | A1 * | 5/2002 | Martinek et al. | 463/10 |
| 2002/0077170 | A1 * | 6/2002 | Johnson et al. | 463/16 |
| 2002/0090990 | A1 | 7/2002 | Joshi et al. | 463/20 |
| 2002/0142825 | A1 | 10/2002 | Lark et al. | 463/16 |
| 2002/0142846 | A1 | 10/2002 | Paulsen | 463/43 |
| 2002/0151349 | A1 | 10/2002 | Joshi | 463/20 |
| 2003/0054881 | A1 | 3/2003 | Hedrick et al. | 463/29 |
| 2003/0064808 | A1 * | 4/2003 | Hecht et al. | 463/42 |
| 2003/0073491 | A1 * | 4/2003 | Hecht et al. | 463/35 |
| 2003/0114214 | A1 | 6/2003 | Barahona et al. | 463/20 |
| 2004/0029637 | A1 | 2/2004 | Hein, Jr. et al. | 463/35 |

FOREIGN PATENT DOCUMENTS

| | | | |
|---|---|---|---|
| EP | 0981 119 | A2 | 2/2000 |
| JP | 5-31254 | | 2/1993 |
| JP | 08-266724 | | 10/1996 |
| JP | 10-277213 | | 10/1998 |
| JP | 2002-177452 | | 6/2002 |
| JP | 2002-263250 | | 9/2002 |
| JP | 2002-272903 | | 9/2002 |
| WO | EP 0977 856 | | 12/1998 |
| WO | WO 01/05477 | A2 | 1/2001 |
| WO | WO 01/05477 | A3 | 1/2001 |
| WO | WO 01/33905 | A2 | 5/2001 |
| WO | WO 01/39905 | A3 | 5/2001 |
| WO | WO 02/24288 | A2 | 3/2002 |
| WO | WO 02/24288 | A3 | 3/2002 |
| WO | WO 02/40921 | A3 | 5/2002 |

OTHER PUBLICATIONS

"WAV", Wikipedia: the Free Encyclopedia, accessed Aug. 3, 2007, <http://en.wikipedia.org/wiki/WAV>.*

Wilson, Tracy V., "How Sound Cards Work", How Stuff Works, first accessed Jul. 25, 2007, <http://computer.howstuffworks.com/sound-card.htm>.*

"Users Guide for SB16 PCI Sound Card", copyright 1999 Creative Technology Ltd, Version 2.0 Mar. 2000, 19 pages.*

Weinert, Joe, "Entertainment Vehicles," International Gaming Wagering Business, pp. 11-12 and 15-18 (Mar. 1997).

European Search Report for European Patent Application No. EP 04 00 0865, dated Oct. 6, 2004 (3 pages).

European Search Report for European Patent Application No. EP 04 00 0730, dated Oct. 11, 2004 (5 pages).

European Search Report for European Patent Application No. EP 04 00 3314, dated Oct. 13, 2004 (3 pages).

European Search Report for European Patent Application No. EP 04 00 0731, dated Oct. 14, 2004 (3 pages).

* cited by examiner

GAMING MACHINE HAVING IMPROVED AUDIO CONTROL ARCHITECTURE

RELATED APPLICATIONS

This application is related to U.S. patent application Ser. No. 10/342,720 entitled "Gaming Machine Environment Having Controlled Audio And Visual Media Presentation," U.S. patent application Ser. No. 10/342,817 entitled "Audio Network For Gaming Machines," U.S. patent application Ser. No. 10/342,809 entitled "Player-Selectable Audio Preferences For A Gaming Machine," and U.S. patent application Ser. No. 10/345,787 entitled "Gaming System With Surround Sound," all of which were filed on Jan. 16, 2003, are assigned to the assignee of the present application, and are incorporated herein by reference in their entireties.

FIELD OF THE INVENTION

The present invention relates generally to gaming machines and, more particularly, to a gaming machine having a control architecture for producing an enhanced audio experience for players of the gaming machine.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, shrewd operators strive to employ the most entertaining and exciting machines available because such machines attract frequent play and, hence, increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game, which may be played in conjunction with a "basic" game. The bonus game may comprise any type of game, either similar to or completely different from the basic game, which is entered upon the occurrence of a selected event or outcome of the basic game. Such a bonus game produces a significantly higher level of player excitement than the basic game because it provides a greater expectation of winning than the basic game and is accompanied by more attractive or unusual video displays and/or audio.

Most types of enhancement, however, have focused primarily on visual effects. For example, gaming machines may include various types of displays for displaying different images in an "attract mode" to stir interest in players. And, the visual effects of the game features, such as reels and symbols, have been changed to be more attractive.

On the other hand, the audio effects of gaming machines have been limited by the processing capability of the gaming machine. While player appeal features related to audio effects have provided some enhanced excitement to gaming machines, there is a continuing need to develop new audio effect features for gaming machines to satisfy the demands of players and operators. Preferably, such new features will further enhance the level of player excitement.

In one commonly used system architecture, the main control module has a main CPU for operating the gaming machine and includes a digital signal processor (DSP) for processing audio data. The main control module also includes the memory device for storing the audio data, which the DSP processes. The processed audio data is converted to analog audio signals that are amplified external to the main control board and transmitted to the audio speakers. This existing system architecture presents some limitations regarding the audio performance of the gaming machine. For example, increasing audio processing capabilities ultimately decreases other processing necessary to operate the gaming machine. Further, as the main control module must be secure, one cannot easily modify the audio components and changes may require regulatory approval.

The present invention is directed to overcoming the aforementioned problems while producing an enhanced audio experience.

SUMMARY OF THE INVENTION

The present invention is directed to a gaming machine having an audio control architecture for producing an enhanced audio experience for players of the gaming machine, without reducing the basic game processing capability of the gaming machine. Furthermore, the invention allows the audio control components to be located in a non-secure location, making any changes to these components much easier.

Specifically, the present invention includes a gaming machine with a first control module and a distinct audio control module. The first control module includes a main processor for randomly selecting one of a plurality of outcomes of the gaming machine in response to a wager amount and for sending audio information that controls audio output from the gaming machine. The audio control module includes an audio processor that receives the audio information from the main processor and processes them into output audio signals. The audio processor is coupled to an audio speaker system, which receives the output audio signals and broadcasts the audio output.

Alternatively, a gaming machine includes a first control module and an audio control module. The first control module includes a main processor and a memory device. The memory device stores operating instructions for the gaming machine. The main processor randomly selects one of a plurality of outcomes in response to a wager amount. Further, the main processor sends audio information that controls audio output from the gaming machine. The audio control module is separate and distinct from the first control module. The audio control module includes an audio processor that receives the audio information from the main processor. The audio control module also includes an audio memory device for storing audio data sets corresponding to the audio output. In response to receiving the audio information, the audio processor selects and processes the audio data sets stored in the audio memory device. The audio processor is coupled to an audio speaker system, which receives the output audio signals and broadcasts the audio output.

The present invention also contemplates novel methods for operating a gaming machine that includes utilization of a separate audio control module that is distinct from the main control module. Further, the present invention contemplates methods for retrofitting existing gaming machines to incorporate enhanced audio effects.

The above summary of the present invention is not intended to represent each embodiment or every aspect of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
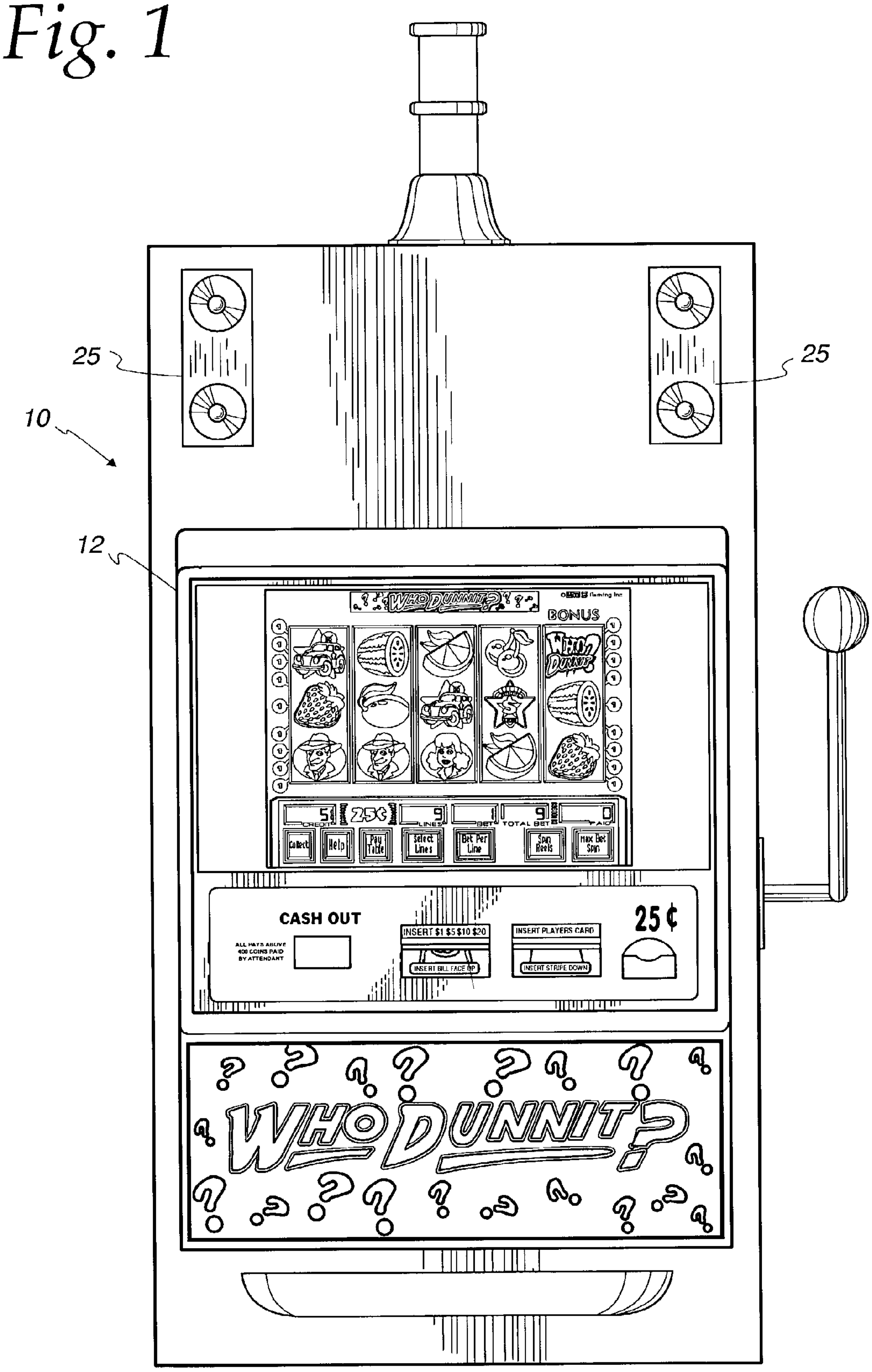
FIG. 1 is a simplified front view of a slot machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that may be used to implement a bonus game according to the present invention. The gaming machine 10 includes a video display 12 that may comprise a dot matrix, CRT, LED, LCD, electro-luminescent display, or generally any type of video display known in the art. In the illustrated embodiment, the gaming machine 10 is an "upright" version in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical, rather than video, displays.

The gaming machine 10 includes a speaker system, which is illustrated in FIG. 1 as a pair of speakers 25, for broadcasting audio output to the player of the game and other spectators adjacent the game. The audio output may include various outputs, such as messages related to the game being played, messages unrelated to the game, a certain type of music (e.g., rock, classical, jazz, etc.), or music related to a theme of a game. The audio speakers 25 are usually located on the front portion of the cabinet and include just one speaker or a plurality of audio speakers 25. The speakers 25 may be arranged in a planar fashion along the front of the gaming machine 10, or they can be positioned in a non-planar fashion around the player of the game. In one preferred alternative, the speakers 25 are spatially arranged and configured for delivering surround sound.

In one embodiment, the gaming machine 10 is operable to play a game entitled WHO DUNNIT?™ having a mystery theme. The WHO DUNNIT?™ game features a basic game in the form of a slot machine with five simulated spinning reels and a bonus game with strategy options directing game activities on the video display 12. It will be appreciated, however, that the gaming machine 10 may be implemented with games other than the WHO DUNNIT?™ game and/or with several alternative game themes.

Figure 2:
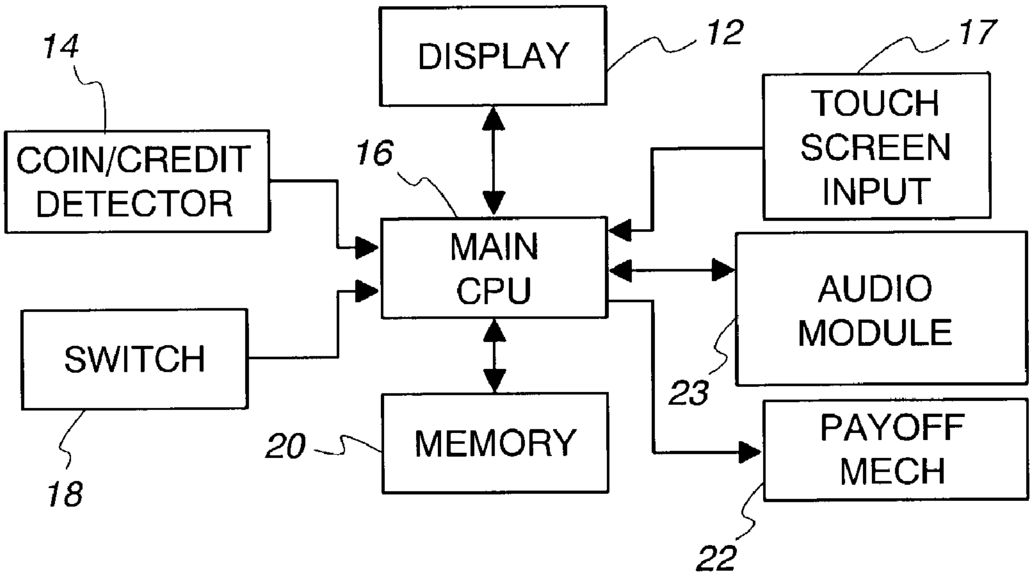
FIG. 2 is a block diagram of a control system suitable for operating the gaming machine in FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select the number of paylines to play and the amount to wager via touch screen input keys 17. The basic game commences in response to the player activating a switch 18 in a lever or push button, causing the CPU 16 to set the reels in motion, randomly select a game outcome, and then stop the reels to display symbols corresponding to the pre-selected game outcome. In one embodiment, certain basic game outcomes cause the CPU 16 to enter a bonus mode, which causes the video display 12 to show a bonus game, as is known in the art.

A system memory 20 stores control software, operational instructions, and data associated with the gaming machine 10. In one embodiment, the system memory 20 comprises a separate read-only memory (ROM) and battery-backed random access memory (RAM). It will be appreciated, however, that the system memory 20 may be implemented on any of several alternative types of memory structures or may be implemented on a single memory structure.

A payoff mechanism 22 is operable in response to instructions from the CPU 16 to award a payoff of coins or credits to the player in response to certain winning outcomes which may occur in the basic game or bonus game. The payoff amounts corresponding to certain combinations of symbols in the basic game are predetermined according to a pay table stored in system memory 20. The payoff amounts corresponding to certain outcomes of the bonus game are also stored in system memory 20.

An audio control module 23 is peripheral to and bi-directionally connected to the main CPU 16. The audio control module 23 controls the audio output from the speakers 25 in response to receiving signals from the main CPU 16. As will be discussed more with respect to FIGS. 3 and 4, the audio control module 23 preferably has its own controller, microprocessor, or DSP, which has access to its own audio memory device that stores the audio data sets. Further, the audio control module 23 preferably has the A/D converters, amplifiers, and other drive circuitry necessary to broadcast the audio output from the speakers 23. In short, the control system of FIG. 2 allows for all of the audio signal processing to occur on a peripheral device, thereby allowing for a more sophisticated audio experience without overburdening the main CPU 16 and the memory 20 of the gaming machine 10.

Figure 3:
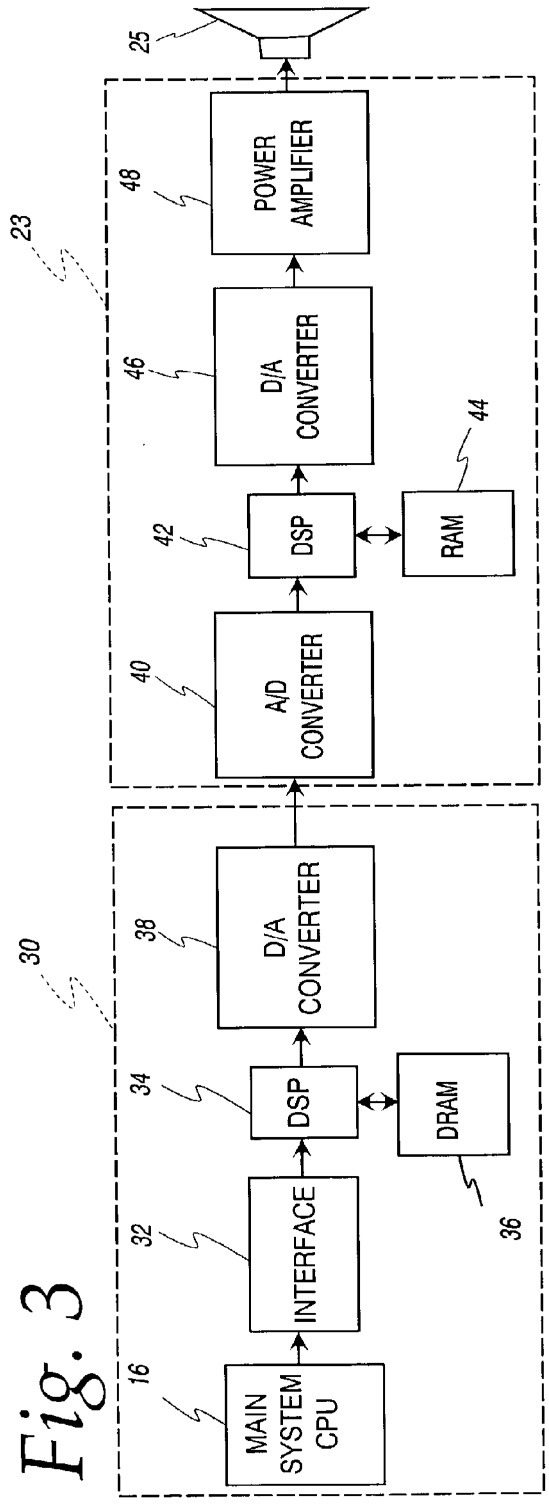
FIG. 3 illustrates one embodiment of a system architecture having a separate and distinct audio control module.

FIG. 3 illustrates a main control module 30 that includes certain components for delivering audio information to an audio control module 23, which processes audio data in response to receiving audio information. As used in FIGS. 3 and 4, "audio information" may include audio signals that are further processed by the audio control module 23, and/or audio control instructions that are used by the audio control module 23 to select and process audio data sets. The main control module 30 may include other gaming machine components, but only the components related to the audio system are shown. The main control module 30 and the audio control module 23 are separate and distinct modules, but are connected via a common interface, such as a standard connector. In the most basic form, the main control module 30 and the audio control module 23 are printed circuit boards. Further, each may be in its own enclosure, providing E-M shielding.

The main control module 30 includes the main CPU 16, which performs the primary operational functions for the gaming machine 10. The main CPU 16 communicates with a DSP 34 via an interface 32, which places instructions from the main CPU 16 in a proper format for the DSP 34. A D/A converter 38 converts the processed digital data from the DSP 34 to analog signals, which are then sent though a connector (not shown) to the audio control module 23. The DSP 34 on the main control module 30 is in communication with a memory device, shown as a DRAM 36 (but other memory devices can be used), which stores audio data for the gaming machine 10. The DRAM 36 may receive and store audio data sets from a main memory 20 (FIG. 2) upon initialization of the gaming machine 10. Also, the downloading of new audio data sets to the DRAM 36 may occur during operation, for example, upon execution of a bonus game. Thus, the DRAM 36 stores the audio data sets and stores processed data from the DSP 36.

It should be noted that the main control module 30, as shown in FIG. 3, is similar to prior art gaming machines. Instead of the analog audio output for the main control module 30 being sent to a power amplifier for driving the speakers 25 of the gaming machine 10, the analog audio output is sent to the audio control module 23 for further processing, thereby achieving enhanced audio effects. Thus, the audio control module 23 can be thought of as a retrofit kit that enhances the audio output for the gaming machine 10.

The audio control module 23 receives the analog audio output from the main control module 30 and converts it back to a digital format via an A/D converter 40. A DSP 42, which preferably provides spatial signal processing, then processes this data. For example, if a plurality of speakers are located on the gaming machine 10, the DSP 42 is able to control the audio energy by directing it to a certain location at the front of the machine 10 that is beyond the location of a player of an adjacent gaming machine so as to not overwhelm or even affect the player of the adjacent gaming machine. Other types of audio directivity can be attained by the DSP 42 to help create a sense of lifelike sound spaciousness for providing a full stereo effect throughout the listening area in front of the gaming machine 10. While processing, the DSP 42 utilizes a memory device, shown as RAM 44, on the audio control module 23.

The DSP 42 preferably performs signal processing to result in a surround sound effect for the gaming machine 10. To this end, the present invention is not limited to simply using the speakers 25 on the gaming machine 10, but may include speakers remotely located from the gaming machine 10 in addition to or in substitution for the speakers 25.

After processing, the digital output from the DSP 42 is then converted back into an analog format by a D/A converter 46. The resultant analog output signal is then amplified by a power amplifier 48 for driving the speakers 25.

It should be understood that the DSP 34 on the main control module 30 can deliver two or more channels of audio data that are sent to multiple different audio control modules 23. Thus, the present invention is not limited to the one channel embodiment that is illustrated in FIG. 3.

Also, in FIG. 3, the DSP 34 and DRAM 36 can be optional components such that the audio control module 23 receives audio information directly from the main CPU 16. In this option, the main CPU 16 develops the audio signals that are sent to the audio control module 23.

Figure 4:
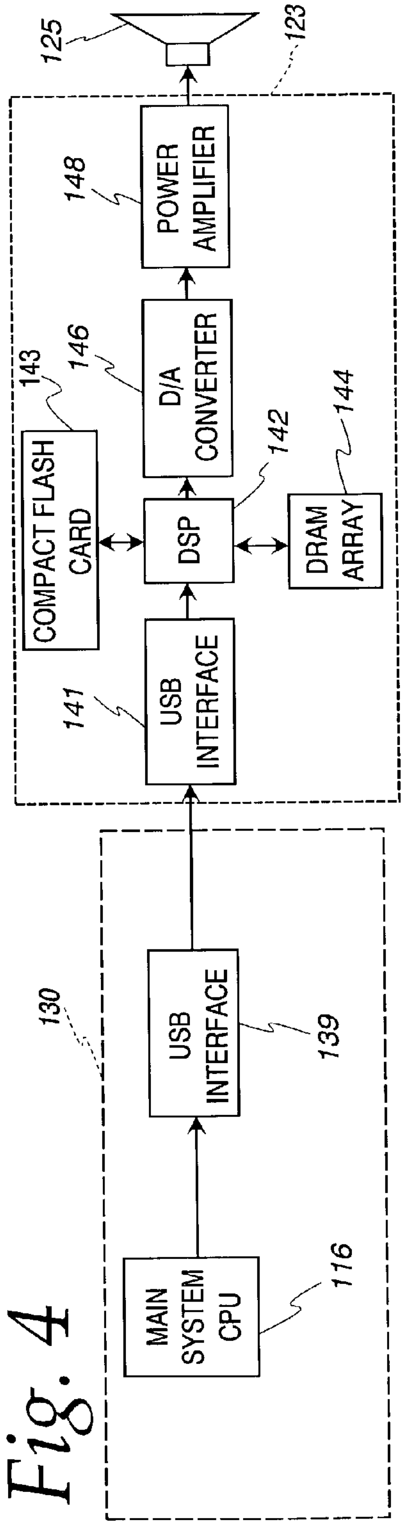
FIG. 4 illustrates an alternative embodiment of a system architecture having a separate and distinct audio control module.

FIG. 4 illustrates an alternative architecture that can be characterized as a master-slave type architecture. All reference numerals are now shown in a 100 series. A main control module 130 includes a main CPU 116 that sends high level audio information to an audio control module 123 via a USB interface 139 on the main control module 130. While a USB interface 139 is shown, other standard interfaces can be utilized, as well. Those high level signals from the main control module 30 are then converted by the audio control module 123 to low level signals (i.e., analog audio signals that drive speakers 125).

The audio control module 123 includes a corresponding USB interface 141 for receiving the audio information, which is then sent to the DSP 142. Upon receiving the high level signals from the main control module 130, the DSP 142 processes the audio data stored in a DRAM array 144. The DRAM array 144 may receive these necessary audio data sets at the initialization of the gaming machine 10 via downloading from the main CPU 16. Alternatively, or in addition to the DRAM array 144, the audio data sets can be stored on a compact flash card 143 that is coupled to the DSP 142.

Once the DSP 142 of the audio control module 123 processes the data, it is converted to an analog audio signal by the D/A converter 146. The resultant analog audio signal is then amplified by the power amplifier 148, and the amplified signals are then transmitted to the speakers 125.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming machine, comprising:

a main control module including a main processor for randomly selecting one of a plurality of outcomes in a wagering game in response to a wager amount, said main control module producing a high-level instruction that controls an audio output from said gaming machine;

an audio control module separate and distinct from said main control module, said audio control module including an audio processor and a memory device for storing audio data sets for said gaming machine, said audio control module receiving said high-level instruction from said main control module, and wherein in response to receipt of said high-level instruction, said audio processor accessing a certain audio data set and processing said certain audio data set to develop output audio signals, including spatial development of said output audio signals; and an audio speaker system for broadcasting said audio output corresponding to said output audio signals received from said audio control module;

wherein said audio processor develops all output audio signals for said gaming machine; and wherein said audio processor, by use of said spatial development, controls and directs audio energy from said audio output to a specific location at a front of said gaming machine for creating a desired audio effect for a player of said gaming machine.

2. The gaming machine of claim 1, wherein said main control module develops said high-level instruction in response to selecting a winning game outcome of said plurality of outcomes.

3. The gaming machine of claim 1, wherein said output audio signals include analog audio signals that are processed by said audio control module.

4. The gaming machine of claim 1, wherein said audio control module further includes an interface for receiving said audio information, a D/A converter for converting processed audio signals from said audio processor, and a power amplifier.

5. The gaming machine of claim 4, wherein said audio processor is a DSP.

6. The gaming machine of claim 4, wherein audio control module includes a USB interface and said high level instructions are received through said USB interface and converted to said output audio signals by said audio control module.

7. The gaming machine of claim 1, wherein said audio speaker system includes at least one speaker remotely located from said gaming machine.

8. The gaming machine of claim 1, wherein said audio speaker system includes at least one speaker mounted on said gaming machine.

9. The gaming machine of claim 1, wherein said main control module includes a first printed circuit board and said audio control module includes a second printed circuit board.

10. A gaming machine, comprising:

a main control module including a main processor and a memory device, said memory device for storing operating instructions for said gaming machine, said main processor for randomly selecting one of a plurality of outcomes of said gaming machine in response to a wager amount, said main control module and for producing a high-level instruction that controls an audio output from said gaming machine;

an audio control module separate and distinct from said main control module, said audio control module including an audio processor that receives said high-level instruction and an audio memory device for storing audio data sets, said audio processor accessing and processing at least one of said audio data sets in response to receiving said high-level instruction from said main control module, said audio processor producing output audio signals corresponding to said audio output; and an audio speaker system for broadcasting said audio output.

11. The gaming machine of claim 10, wherein said audio memory device is a compact flash card.

12. The gaming machine of claim 10, wherein said audio controller selects said at least one of said audio data sets in response to receiving said high-level instruction.

13. The gaming machine of claim 10, wherein said audio control module includes an interface for receiving said high-level instruction, a D/A converter for converting processed audio signals from said audio processor, and a power amplifier.

14. The gaming machine of claim 13, wherein said audio processor is a DSP.

15. The gaming machine of claim 13, wherein said audio memory device includes a compact flash card.

16. The gaming machine of claim 13, wherein said audio memory device includes a DRAM array.

17. The gaming machine of claim 10, wherein said main control module and said audio control module are enclosed.

18. The gaming machine of claim 10, wherein said high-level instruction corresponds to an audio output that contains a message for a player of said gaming machine.

19. The gaming machine of claim 18, wherein said message relates to an outcome achieved by said gaming machine.

20. The gaming machine of claim 10, wherein said audio speaker system includes at least one speaker remotely located from said gaming machine.

21. The gaming machine of claim 10, wherein said audio speaker system includes a plurality of speakers.

22. The gaming machine of claim 10, wherein said main control module includes a first printed circuit board and said audio control module includes a second printed circuit board.

23. A method of operating a gaming machine that receives wager inputs and randomly selects outcomes after receiving said wager inputs, comprising:

determining, via a main control module for said gaming machine, an audio output to be broadcast from said gaming machine;

sending a high-level instruction corresponding to said audio output from said main control module to an audio control module that is distinct from said main control module, said audio control module including an audio processor and a memory device storing audio data;

in response to receiving said high-level instruction at said audio control module, accessing said audio data stored on said memory device with said audio processor;

processing said audio data at said audio control module with said audio processor so as to produce output audio signals; and driving at least one speaker with said output audio signals.

24. The method of claim 23, wherein said step of determining is in response to a selection of a certain one of said outcomes.

25. The method of claim 23, wherein said audio processor is a DSP and said output audio signals are amplified at said audio control module.

26. A method of operating a gaming machine that receives wager inputs and randomly selects outcomes after receiving said wager inputs, comprising:

accessing a main memory device located on a main control module and containing game operating instructions;

randomly selecting an outcome from a plurality of outcomes in accordance with said game operating instructions;

transmitting high-level audio instructions from said main control module to an audio control module that is distinct from said main control module, said audio control module including an audio memory device and a digital signal processor, said audio memory device storing audio data for said wagering game;

in response to receiving said high-level audio instructions at said audio control module, accessing, with said digital signal processor, said audio data from said an audio memory device; and processing said audio data, including spatial processing of said audio data, with said digital signal processor at said audio control module so as to produce output audio signals, said spatial processing controlling and directing audio energy to a specific location at a front of said gaming machine for creating a desired audio effect for a player of said gaming machine, wherein said audio control module processes all output audio signals for said gaming machine.

27. The method of claim 26, wherein said audio control module includes a USB interface, and further including transmitting said high level audio instructions from said main control module to said audio control module through said USB interface.

28. The method of claim 27, wherein transmitting occurs in response to said selecting of a certain outcome.

* * * * *

UNITED STATES PATENT AND TRADEMARK OFFICE
CERTIFICATE OF CORRECTION

PATENT NO. : 8,313,374 B2
APPLICATION NO. : 10/366948
DATED : November 20, 2012
INVENTOR(S) : Loose It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2,192 days.

Signed and Sealed this
Twenty-eighth Day of October, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,313,374 B2
APPLICATION NO. : 10/366948
DATED : November 20, 2012
INVENTOR(S) : Timothy C. Loose It is certified that error appears in the above-identified patent and that said Letters Patent is hereby corrected as shown below:

In the Claims

On Column 7, Line 27 (Claim 10, Line 7), delete "and for" after "module"

On Column 8, Line 46 (Claim 26, Line 17), delete "an" before the second instance of "audio"

Signed and Sealed this
Twenty-second Day of September, 2015

Michelle K. Lee

Michelle K. Lee
*Director of the United States Patent and Trademark Office*